US007934551B1

(12) United States Patent
Bader

(10) Patent No.: US 7,934,551 B1
(45) Date of Patent: May 3, 2011

(54) METHODS TO PROPERLY USE SALINE WATER FOR OIL RESERVOIRS INJECTION OPERATIONS

(76) Inventor: Mansour S. Bader, College Station, TX (US)

( * ) Notice: Subject to any disclaimer, the term of this patent is extended or adjusted under 35 U.S.C. 154(b) by 0 days.

(21) Appl. No.: 12/322,934

(22) Filed: Feb. 7, 2009

(51) Int. Cl.
*E21B 43/40* (2006.01)
(52) U.S. Cl. ......... 166/267; 166/282; 166/307; 166/371
(58) Field of Classification Search .................. None
See application file for complete search history.

(56) References Cited

U.S. PATENT DOCUMENTS 6,365,051 B1 4/2002 Bader
7,392,848 B1 7/2008 Bader

*Primary Examiner* — Zakiya W. Bates

(57) ABSTRACT

This invention presents innovative and off the beaten path methods to mainly produce suitable saline streams for oilfields water injection operations. The production of such suitable saline streams can: (1) be achieved economically; and (2) meet the actual stringent requirements for injection operations to steadily enhance oil production from depleted and plugged wells.

14 Claims, 1 Drawing Sheet

METHODS TO PROPERLY USE SALINE WATER FOR OIL RESERVOIRS INJECTION OPERATIONS

BACKGROUND OF THE INVENTION

Production declines in oil reservoirs take place as a result of depletion and/or damages by organic and inorganic species deposition (formation surface deposition, pore throat plugging, and re-entrainment into reservoir's fluids). The deposition of organic and inorganic species can be attributed to: (1) asphaltenes; (2) heavy paraffins; (3) carboxylate scale, carbonate scale, sulfate scale, or combinations of such scale in the forms of alkaline cations; and (4) finely dispersed clays particles (e.g., kaolinite, illite, smectite, or combinations) through perforation tunnels and gravel packs.

The pore throat diameter in oil reservoirs varies from 1 to 11 μm. Sandstone oil reservoirs, in particular, tend to be homogeneous with low permeability and porosity contrasts in any given single interval. Once precipitates or fine particles deposited within pores, they can not be extracted back into the reservoir by stimulation treatment. However, they can be pierced through into the other side of the plugged pores. The success of re-perforation in oil reservoirs is usually limited or short lived.

Depletion and asphaltenes precipitation in oil reservoirs can be averted by injecting, for instance, saline water to increase the reservoir's pressure above the saturation pressure and thus enhance oil recovery and prevent asphaltenes precipitation. Paraffins precipitation unlikely takes place if the reservoir's temperature is higher than the paraffins' cloud point temperatures.

Possible sources of saline water for injection operations in oil reservoirs include, for instance, aquifers saline water or oil-fields produced water. However, aquifers water could cause fine clays deposition depending on their formation rock while oil-fields produced water tend to cause at least calcium carboxylate and/or calcium carbonate scale deposition. Insufficient quantities and/or unacceptable qualities of each standalone source of saline water are always problematic in injection operations. Thus, such sources of saline water are most likely blended to sufficiently fill the reservoir voidage and fulfill the pressure support requirement.

The quality of saline water as strictly measured by its oil content and total suspended solids (TSS) is of significant importance since poor quality leads to injectivity reduction and wells plugging. The general parameters guidelines for the required quality of saline water to be injected in oil reservoirs are not to exceed: (1) 50 mg/L of oil content; and (2) 10 mg/L of TSS with 10 μm of particle size. Although providing meaningful parameters guidelines is important, however, such guidelines could obscure significant fundamental issues. Such issues could render saline water injection very expensive operations and cause irreversible reservoir damages.

True understanding of the nature and specific requirements for a given oil reservoir along with the chemistry of the designated saline water are a must for successful injection operations. Thus, this invention presents innovative and off the beaten path methods to provide an acceptable quality of saline water that is: (1) actually needed to steadily enhance oil production; and (2) technically and economically achievable.

SUMMARY OF THE INVENTION

In one aspect, the present invention provides a method for blending oil-fields produced water with saline water to produce at least a nearly free saline stream of carboxylates and suspended particles. The inventive method comprises the steps of: (a) increasing the pH of oil-fields produced water by adding an amine solvent to increase the dissociation of carboxylates; (b) mixing the pH increased oil-fields produced water with saline water to produce intermediate saline stream and dispersed oily droplets by bonding carboxylates in the pH increased oil-fields produced water with suspended particles in saline water; (c) separating the dispersed oily droplets from the intermediate saline stream by hydrophobic membranes to produce nearly free saline stream of carboxylates and suspended particles; (d) removing the amine solvent and oxygen from the nearly free saline stream of carboxylates and suspended particles by a vacuum-based unit; and (e) injecting the nearly free saline stream of carboxylates and suspended particles into subterranean formation for hydrocarbons recovery. Saline water is aquifer water, seawater, or a combination thereof. The amine solvent is selected from the group consisting of isopropylamine, propylamine, dipropylamine, diisopropylamine, ethylamine, diethylamine, methylamine, dimethylamine, or a combination thereof. The vacuum-based unit is vacuum membrane distillation, vacuum distillation, vacuum deaerator, or a combination thereof.

In another aspect, the present invention provides a method for blending oil-fields produced water with saline water to produce at least a nearly free saline stream of carboxylates and suspended particles. The inventive method comprises the steps of: (a) mixing oil-fields produced water with saline water to form intermediate saline stream and dispersed oily droplets by bonding carboxylates in oil-fields produced with suspended particles in saline water; (b) separating the dispersed oily droplets from the intermediate saline stream by hydrophobic membranes to produce nearly free saline stream of carboxylates and suspended particles; (c) removing oxygen from the nearly free saline stream of carboxylates and suspended particles by a vacuum-based unit; and (d) injecting the nearly free saline stream of carboxylates and suspended particles into subterranean formation for hydrocarbons recovery. Saline water is aquifer water, seawater, or a combination thereof. The vacuum-based unit is vacuum membrane distillation, vacuum distillation, vacuum deaerator, or a combination thereof.

In yet another aspect, the present invention provides a method for removing carboxylic acids from an aqueous stream to produce at least a nearly free aqueous stream of carboxylic acids. The inventive method comprises the steps of: (a) increasing the pH of the aqueous stream by adding an amine solvent to produce an intermediate aqueous stream and enhance the dissociation of carboxylic acids; (b) separating carboxylic acids from the intermediate aqueous stream by hydrophobic membranes to produce nearly free aqueous stream of carboxylic acids; (c) removing the amine solvent and oxygen from the nearly free aqueous stream of carboxylic acids by a vacuum-based unit; and (d) injecting the nearly free aqueous stream of carboxylic acids into subterranean formation for hydrocarbons recovery. The aqueous stream is oil-fields produced water or industrial by-product water. The amine solvent is selected from the group consisting of isopropylamine, propylamine, dipropylamine, diisopropylamine, ethylamine, diethylamine, methylamine, dimethylamine, or a combination thereof. The vacuum-based unit is vacuum membrane distillation, vacuum distillation, vacuum deaerator, or a combination thereof.

In yet another aspect, the present invention provides a method for removing carboxylic acids from an aqueous stream to produce at least a nearly free aqueous stream of carboxylic acids. The inventive method comprises the steps of (a) separating dissolved and naturally dissociated carboxylic acids from the aqueous stream by hydrophobic membranes to produce nearly free aqueous stream of carboxylic acids; (b) removing oxygen from the nearly free aqueous stream of carboxylic acids by a vacuum-based unit; and (c) injecting the nearly free aqueous stream of carboxylic acids into subterranean formation for hydrocarbons recovery. The aqueous stream is oil-fields produced water or industrial by-product water. The vacuum-based unit is a vacuum membrane distillation, vacuum distillation, vacuum deaerator, or a combination thereof.

This invention is not restricted to use in connection with one particular application or industry. Further objects, novel features, and advantages of the present invention will be apparent to those skilled in the art upon examining the accompanying drawings and upon reading the following description of the preferred embodiments, or may be learned by practice of the invention.

DESCRIPTION OF THE PREFERRED EMBODIMENT

Aquifers Saline Water

Figure 1:
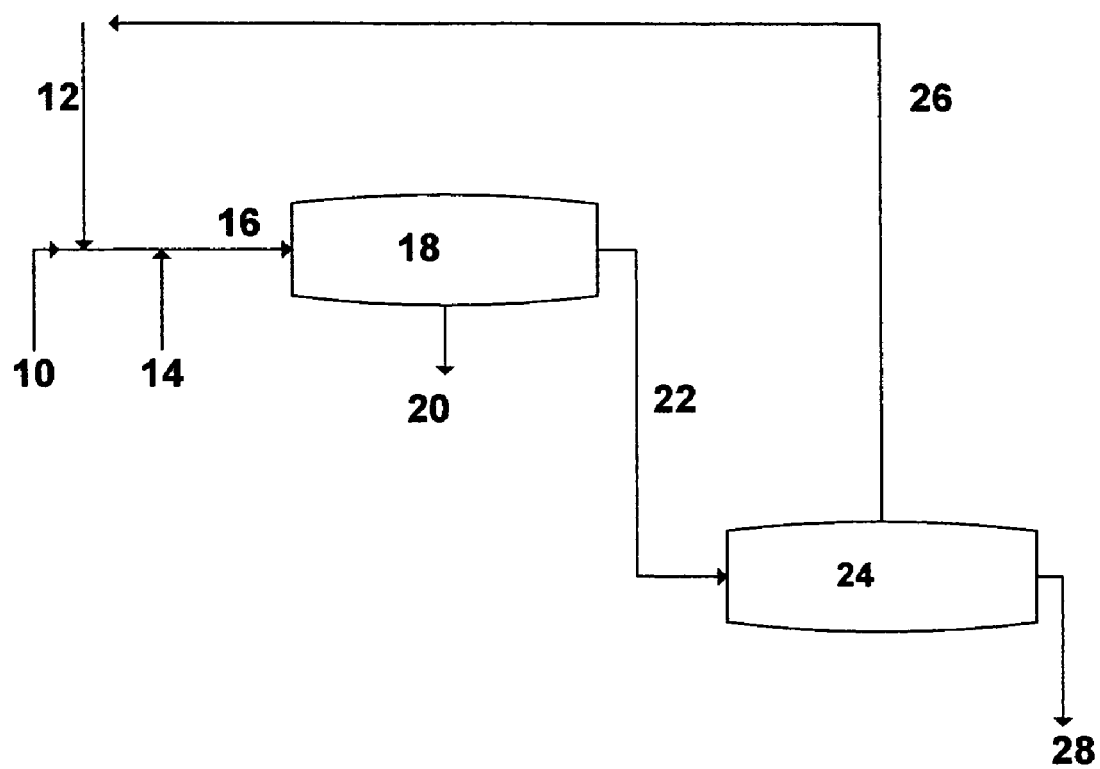
FIG. 1 illustrates a possible flow diagram for blending and treating oil-fields produced water and aquifers saline water for oil reservoirs injection operations.

The nature of the suspended particles as related to the formation of the aquifer water source is very important in selecting the source of aquifer water. This is the parameter that the planners of the saline water injection project should be focused on. The oil content is totally insignificant since aquifers water is almost always free of oil content.

Clays exist in any formation and their portions depend on the formation type. For instance, clays constitute significant portions (e.g., >40%) of the total mineralogy in sandstone formation. Clay particles are aluminosilicates that contain water trapped between the silicate sheets. They can be divided into at least three major groups: (1) kaolinites with a general structure of $Al_2Si_2O_5(OH)_4$; (2) smectites with a general structure of $(Ca, Na, H)(Al, Mg, Fe, Zn)_2(Si, Al)_4O_{10}(OH)_2\cdot xH_2O$; and (3) illites with a general structure of $(K, H)Al_2 (Si, Al)_4O_{10}(OH)_2\cdot xH_2O$. The $xH_2O$ term in the smectites and illites represents the variable water content that members of these groups could contain. Such groups of clays are chemically and structurally analogous to the kaolinites group except they contain varying amounts of water that allow more substitution of their cations.

The physical characteristics of clays are very important since they: (1) form microns and sub-microns particles (an important factor in saline water injection); (2) can absorb or lose water from simple humidity or temperature or salinity changes; (3) often swell when water with incompatible salinity is absorbed as the water fills the spaces between the stacked silicate layers (another important factor in saline water injection); and (4) are rarely found separately and usually are mixed not only with other clays but also with sub-microns particles of quartz, feldspars, and carbonates (due to dissociation of their hydroxyl groups).

Finely dispersed clay's particles (e.g., 0.01 to 0.1 µm) are very critical since the attractive forces between them are considerably less than the repelling forces of their electric charges. Thus, they are nearly immune to any traditional water treatment steps such as coagulation, flocculation and filtration. If such dispersed clay's particles are kept in the aquifers water without removal or further dispersion or sufficient stabilization before injection, they are destined to cause blockages or plugging at the pore throats of the oil reservoir. The resultant decline in permeability can severely impair the productivity of oil wells. The typical acid treatment in sandstone oil reservoirs, for example, is very complex to reverse clays plugging and the global success rate of such a treatment is very discouraging (<30%).

Oil-Fields Produced Water

Oil content and TSS are critical in oil-fields produced water since: (1) dispersed and dissolved oil residues remain in produced water; (2) produced water is collected from different gathering centers and potential incompatibility would affect the TSS of the gathered produced water.

Accurate and complete oil content measurements, in particular, are very crucial. The oil content in produced water consists of three portions: (1) the dispersed (or floating) insoluble oil droplets on the produced water surface; (2) the dissolved non-polar hydrocarbons (species that are strictly composed of hydrogen-carbon chains and known as Total Petroleum Hydrocarbons or TPH); and (3) the dissolved organic non-hydrocarbons that consist of mainly oxygen-containing species and known as carboxylic or fatty or naphthenic acids. It should be pointed out that the dissolved species are mostly sparingly water soluble species. However, they remain dissolved in produced water because they are below their aqueous solubility limits and the hyper salinity of produced water tends to slightly increase their limited aqueous solubilities.

Oxygen compounds such as carboxylic acids in crude oil exist within their higher molecular weights, sparingly water soluble and nonvolatile hydrocarbons (e.g., heavy n-paraffins, cyclo- and dicyclo-paraffins, ploynucleiaromatics etc.). As such, the carbon structures of carboxylic acids typically correspond with the structures of hydrocarbons that co-exist with. For instance, medium- to long-: (1) straight chain aliphatic carboxylic acids are predominant in heavy n-paraffins crude; (2) monocyclic and dicyclic carboxylic acids are predominant in cyclo- and dicyclo-paraffins; and (3) aromatic carboxylic acids are predominant in ploynucleiaromatics. Such higher-molecular weight carboxylic acids are sparingly soluble in water (similar to their counter hydrocarbons).

However, a portion of medium- to higher-molecular weight carboxylic acids in downhole reservoirs conditions can be hydrolyzed and/or thermally decomposed to lower-molecular weight carboxylic acids. As such, reservoirs' brine regardless of their hydrocarbons natures, contain low molecular weights and water miscible carboxylic acids (e.g., formic, acetic, propionic, and butyric acids). The highest concentrations of such acids tend to be in downhole brine at 80-100° C.

Most of the reported oil content measurements in oil-fields produced water are based on the "dispersive infrared measurements" and thus they are limited to the determination of only the dissolved Total Petroleum Hydrocarbons (TPH). As such, the dispersed oil and carboxylic acids portions are typically not included in the reported oil content measurements. To properly evaluate oil-fields produced water for oil reservoirs injection operations, however, the quantifications of such missing oil portions must be included.

The determination, in particular, of carboxylic acids in oil-fields produced water is of a significant importance. At a pH value of 6.5, as is the case with most oil-fields produced water at the surface, reactive carboxylic acids with molecular weights between 150 and 350 exist in produced water. Such carboxylic acids contain the carboxylate (naphthenate)

RCOO⁻ anions, and thus they are negatively charged. Depending on their structural identities, concentrations and dissociation in produced water as a function of pH values, they pair with positively charged species. Cations such as sodium and calcium can therefore form sodium or calcium carboxylate precipitates (known as soaps).

As carbon dioxide and other acid gases are vented from the processing of wet crude oil at the surface, the pH values of the segregated produced water from the wet crude oil would increase. The result is the potential precipitation of mixed calcium carbonate/calcium carboxylate along with the formation carboxylate emulsion (surface active species). Once produced water is re-injected for pressure support, the downhole pH of the newly mixed fluid media in the reservoir would decrease, and thus bicarbonate serves as a buffer which would enhance the generation of carboxylate anions. The carbonate-carboxylate interactions are depicted as follows:

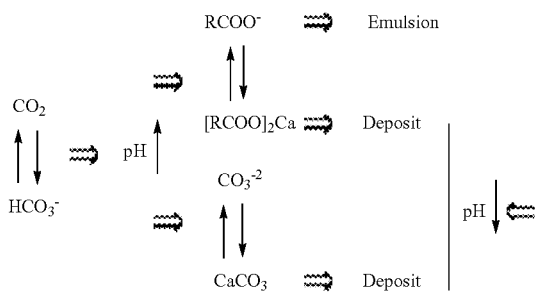

In the case of sandstone oil reservoirs, the ionic charge (zeta potential) on sandstone formation surfaces generally varies as follows: positive at pH values below 4-5; neutral at the pH value of 4-5; and negative at pH values above 4-5. However, downhole brine in most oil reservoirs is generally rich with sodium-calcium chloride, and the sufficient presence of the calcium ion in the brine could positively change the ionic charge of sandstone formation surfaces above the 4-5 pH values. This is attributed to the classical charge reversal brought on by the adsorption of divalent ions (e.g., calcium) of opposite charge to the sandstone formation surfaces (e.g., quartz and clays).

In the case of carbonate oil reservoirs, the ionic charge on calcite formation surfaces varies as follows: positive at pH values below 8.3; neutral at the pH value of 8.3; and negative at pH values above 8.3. The ionic charges on dolomite and magnesite formation surfaces behave nearly similarly to calcite formation surfaces: positive at pH values below 7-8; neutral at the pH values 7-8; and negative at pH values above 7-8.

Since the generated carboxylates are negatively charged (anions), and sandstone as well as carbonate formation surfaces are positively charged at the typical downhole pH values (4.0 to 5.5), such carboxylates adsorb on the sandstone or carbonate formation matrix surfaces to comprise deposits of organic acid coatings. Such deposits can be further strengthened by the presence, for instance, of heavy hydrocarbons and asphaltenes. If such carboxylates are kept in produced water without removal before injection, they are destined to plug the formation matrix of the oil reservoir.

Blending Aquifers Saline Water with Oil-Fields Produced Water

As explained above, clays are intercalation minerals that form layered structures of aluminosilicates or ions-aluminosilicates with hydroxyl groups. For instance, kaolinite ($Al_2Si_2O_5(OH)_4$) is a two-layer aluminosilicate clay consisting of alternating silica and alumina with hydroxyl groups at the particle edge. Carboxylic acids can form reactive (ester) linkage through their carboxylate (RCOOH) groups to the hydroxyl groups (R"OH) on the clay particles (acid-base reaction). My solution is thus innovatively centered on bonding the finely dispersed clay's particles in aquifers water with carboxylic acids in produced water and then separated them as organic (oily) coated droplets or layers from the blended saline water using hydrophobic membranes. As such, carboxylates in produced water serve as an adsorption sink for the finely dispersed clay's particles in aquifers water.

To nearly completely dissociate carboxylic acids in produced water to enhance their adsorption to sub-microns suspended clays particles, the pH of produced water should be increased. The higher the pH value, the higher the carboxylates concentrations. Several solvents have been identified for potential use to increase the pH values of produced water. These solvents are isopropylamine (IPA), ethylamine (EA), propylamine (PA), dipropylamine (DPA), diisopropylamine (DIPA), diethylamine (DEA), and dimethylamine (DMA). However, IPA is the preferred solvent for pH adjustment. The preference of IPA is attributed to its favorable properties (boiling point: 32.4° C.; vapor pressure: 478 mmHg at 20° C.) that would allow it's near complete recovery as well as its minimal environmental risks.

The membrane concept takes advantages of the facts that dispersed organic (oily) droplets and water are immiscible, and a properly configured hydrophobic membrane would efficiently repel water. As such, the oily coated droplets (the membrane wetting species) can permeate through the hydrophobic membrane by applying a very low pressure while water (the non-wetting liquid) is repelled by the membrane hydrophobicity.

Reference is now made to FIG. 1, which depicts a simplified possible flow diagram illustrating the blending of oil-fields produced water and aquifer saline water to bond carboxylates with suspended particles and then separate such bonded species as oily droplets from the blended saline stream. The pH value of a pre-filtered oil-field produced water stream [10] will be adjusted by adding an amine solvent [12] to nearly completely dissociate carboxylic acids before blending with a pre-filtered aquifer saline stream [14]. The blended saline stream [16] will then be fed to a stage of hydrophobic membranes [18] to recover the carboxylates-coated suspended particles as oily droplets [20] from the saline stream [22]. After that, the saline stream [22] will be delivered to preferably another stage of hydrophobic membranes [24] that serves as a vacuum membranes distillation unit to recover the amine solvent [26] from the treated saline water [28]. The vacuum membranes distillation unit [24] can serve dual purposes by also removing oxygen from the treated saline stream. The recovered amine solvent [26] will be condensed and reused while the treated saline stream [28] will be injected in oil reservoirs. It should be pointed out that the step of adding an amine solvent [12] can be eliminated if the pH adjustment is not essential, and thus the vacuum membranes distillation unit [24] will only be used to deplete oxygen from the treated saline stream. It should also be pointed out that the vacuum membranes distillation unit [24] can be replaced with other appropriate units (e.g., vacuum deaerator, vacuum distillation or pervaporation) for the recovery of the amine solvent and/or the depletion of oxygen.

It should be understood that this invention can be used for blending oil-fields produced water with seawater instead of aquifers saline water to bond carboxylates in produced water with suspended particles in seawater.

It should also be understood that this invention can be used for the removal of carboxylic acids and other oily species from only oil-fields produced water without blending with aquifers saline water to be injected in oil reservoirs or to meet environmental regulations or any other purposes.

It should also be understood that this invention can be used for the removal carboxylic acids including water miscible acids (such as acetic, formic, acetic, propionic and butyric acids) from aqueous streams (e.g., industrial by-product water) other than oil-fields produced water.

It should also be understood that the identified amine solvents in this invention can be used as effective dispersants to lift heavy wet crude oil emulsions from downhole and/or to transport such emulsions via pipelines.

What is claimed is:

1. A method for blending oil-fields produced water with saline water to remove carboxylates and suspended particles and produce a suitable saline stream, said method comprising the steps of:
    (a) increasing the pH of said oil-fields produced water by adding an amine solvent to enhance the dissociation of said carboxylates;
    (b) mixing said pH increased oil-fields produced water with said saline water to produce intermediate saline stream and dispersed oily droplets by bonding said carboxylates in said pH increased oil-fields produced water with said suspended particles in said saline water;
    (c) separating said dispersed oily droplets from said intermediate saline stream by hydrophobic membranes to remove said carboxylates and suspended particles and to produce said suitable saline stream;
    (d) removing said amine solvent and oxygen from said suitable saline stream by vacuum based unit;
    (e) injecting said suitable saline stream into subterranean formation for hydrocarbons recovery.

2. The method of claim 1 wherein said saline water is aquifer water, seawater, or a combination thereof.

3. The method of claim 1 wherein said amine solvent is selected from the group consisting of isopropylamine, propylamine, dipropylamine, diisopropylamine, ethylamine, diethylamine, methylamine, dimethylamine, or a combination thereof.

4. The method of claim 1 wherein said vacuum based unit is vacuum membrane distillation, vacuum distillation, vacuum deaerator, or a combination thereof.

5. A method for blending oil-fields produced water with saline water to remove carboxylates and suspended particles and produce a suitable saline stream, said method comprising the steps of
    (a) mixing said oil-fields produced water with said saline water to form intermediate saline stream and dispersed oily droplets by bonding said carboxylates in said oil-fields produced water with said suspended particles in said saline water;
    (b) separating said dispersed oily droplets from said intermediate saline stream by hydrophobic membranes to remove said carboxylates and suspended particles and to produce said suitable saline stream;
    (c) removing oxygen from said suitable saline stream by vacuum based unit;
    (d) injecting said suitable saline stream into subterranean formation for hydrocarbons recovery.

6. The method of claim 5 wherein said saline water is aquifer water, seawater, or a combination thereof.

7. The method of claim 5 wherein said vacuum based unit is vacuum membrane distillation, vacuum distillation, vacuum deaerator, or a combination thereof.

8. A method for removing carboxylic acids from an aqueous stream to produce a suitable aqueous stream, said method comprising the steps of:
    (a) increasing the pH of said aqueous stream by adding an amine solvent to produce intermediate aqueous stream and enhance the dissociation of said carboxylic acids;
    (b) separating said carboxylic acids from said intermediate aqueous stream by hydrophobic membranes to produce said suitable aqueous stream;
    (c) removing said amine solvent and oxygen from said suitable aqueous stream by vacuum based unit;
    (d) injecting said suitable aqueous stream into subterranean formation for hydrocarbons recovery.

9. The method of claim 8 wherein said aqueous stream is oil-fields produced water or industrial by-product water.

10. The method of claim 8 wherein said amine solvent is selected from the group consisting of isopropylamine, propylamine, dipropylamine, diisopropylamine, ethylamine, diethylamine, methylamine, dimethylamine, or a combination thereof.

11. The method of claim 8 wherein said vacuum based unit is vacuum membrane distillation, vacuum distillation, vacuum deaerator, or a combination thereof.

12. A method for removing carboxylic acids from an aqueous stream to produce a suitable aqueous stream, said method comprising the steps of:
    (a) separating dissolved and naturally dissociated said carboxylic acids from said aqueous stream by hydrophobic membranes to produce said suitable aqueous stream;
    (b) removing oxygen from said suitable aqueous stream by vacuum based unit;
    (c) injecting said suitable aqueous stream into subterranean formation for hydrocarbons recovery.

13. The method of claim 12 wherein said aqueous stream is oil-fields produced water or industrial by-product water.

14. The method of claim 12 wherein said vacuum based unit is vacuum membrane distillation, vacuum distillation, vacuum deaerator, or a combination thereof.

* * * * *